US008820665B2

United States Patent
Nelson et al.

(10) Patent No.: US 8,820,665 B2
(45) Date of Patent: Sep. 2, 2014

(54) FLUID DISPENSING NOZZLE

(75) Inventors: Cory J. Nelson, Racine, WI (US); Nitin Sharma, Kenosha, WI (US); Padma Prabodh Varanasi, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 716 days.

(21) Appl. No.: 12/141,602

(22) Filed: Jun. 18, 2008

(65) Prior Publication Data

US 2009/0078793 A1   Mar. 26, 2009

Related U.S. Application Data

(60) Provisional application No. 60/974,941, filed on Sep. 25, 2007.

(51) Int. Cl.
*B05B 1/00* (2006.01)

(52) U.S. Cl.
USPC ........... 239/589; 239/593; 239/594; 239/595; 239/597; 239/601

(58) Field of Classification Search
USPC .............. 239/589, 589.1, 591–595, 597, 601, 239/598, 599
See application file for complete search history.

(56) References Cited

U.S. PATENT DOCUMENTS

| | | | |
|---|---|---|---|
| 2,026,743 A * | 1/1936 | Kurtz | 239/594 |
| 4,020,979 A | 5/1977 | Shay et al. | |
| 4,185,777 A | 1/1980 | Bauer | |
| 4,216,913 A * | 8/1980 | Troup | 239/594 |
| D268,204 S | 3/1983 | Wesner et al. | |
| 4,428,509 A | 1/1984 | Emerson et al. | |
| D280,125 S | 8/1985 | Butterfield et al. | |
| D291,780 S | 9/1987 | Guttormson | |
| 4,905,911 A | 3/1990 | Sakuma | |
| 4,923,448 A | 5/1990 | Ennis | |
| D310,635 S | 9/1990 | Schultz et al. | |
| 5,044,561 A | 9/1991 | Holzgrefe | |

(Continued)

FOREIGN PATENT DOCUMENTS

| | | |
|---|---|---|
| GB | 732473 A | 6/1955 |
| GB | 1253221 A | 11/1971 |

(Continued)

OTHER PUBLICATIONS

GLORY Actuator Drawing No. AD-72088-04, 1972.

(Continued)

*Primary Examiner* — Jason Boeckmann

(57) ABSTRACT

A nozzle is provided for dispensing a liquid from a container in a desirable, nearly rectangular spray pattern. The nozzle includes an actuator having an inlet end adapted to receive liquid from the container and an outlet end, the actuator outlet end defining an outlet chamber. An insert is coupled to the actuator outlet end and defines an insert passage in fluid communication with the outlet chamber. The insert includes at least a first convex shoulder disposed downstream of the outlet chamber, and a nozzle outlet disposed downstream of the first convex shoulder. The convex shoulder may have a radius of curvature and side walls may be provided at an angle of convergence. The radius of curvature and the angle of convergence may be provided within certain ranges to obtain the desired spray pattern at the desired flow rate using typical aerosol can pressures.

20 Claims, 4 Drawing Sheets

(56) References Cited

U.S. PATENT DOCUMENTS

| | | | |
|---|---|---|---|
| 5,065,945 A | 11/1991 | Vidusek et al. | |
| D328,244 S | 7/1992 | Hamilton et al. | |
| D335,809 S | 5/1993 | Reifenberger | |
| 5,255,848 A | 10/1993 | Rhodehouse | |
| D350,249 S | 9/1994 | Rhodenbaugh | |
| 5,350,116 A * | 9/1994 | Cater | 239/333 |
| 5,358,179 A | 10/1994 | Lund | |
| D366,051 S | 1/1996 | Lewis et al. | |
| 5,553,783 A | 9/1996 | Slavas et al. | |
| 5,639,025 A | 6/1997 | Bush | |
| 5,655,715 A | 8/1997 | Hans et al. | |
| 5,680,992 A | 10/1997 | Grytz et al. | |
| 5,692,682 A | 12/1997 | Soule et al. | |
| 5,707,012 A | 1/1998 | Maier et al. | |
| 5,711,488 A | 1/1998 | Lund | |
| 5,769,325 A * | 6/1998 | Jouillat et al. | 239/337 |
| 5,868,321 A | 2/1999 | Haruch | |
| D408,495 S | 4/1999 | Adams | |
| 5,890,655 A | 4/1999 | Collias et al. | |
| 5,992,765 A | 11/1999 | Smith | |
| 6,000,633 A | 12/1999 | Lund et al. | |
| 6,036,116 A | 3/2000 | Bui | |
| 6,152,190 A | 11/2000 | Smith | |
| D438,111 S | 2/2001 | Woods | |
| 6,315,221 B1 * | 11/2001 | Goenka et al. | 239/594 |
| D462,268 S | 9/2002 | Schroeder et al. | |
| D462,740 S | 9/2002 | Schroeder et al. | |
| 6,442,788 B1 | 9/2002 | Fleischer | |
| 6,457,658 B2 | 10/2002 | Srinath et al. | |
| 6,460,780 B1 | 10/2002 | Zimmer et al. | |
| D469,847 S | 2/2003 | Schroeder et al. | |
| 6,513,185 B1 | 2/2003 | Zimmer et al. | |
| D471,797 S | 3/2003 | Guerrera et al. | |
| D473,927 S | 4/2003 | Johnson | |
| D474,255 S | 5/2003 | Johnson | |
| D480,125 S | 9/2003 | Johnson | |
| D484,411 S | 12/2003 | Haruch | |
| D497,407 S | 10/2004 | Mather | |
| 6,817,493 B1 | 11/2004 | Parsons et al. | |
| 6,820,823 B2 | 11/2004 | Parsons et al. | |
| D499,463 S | 12/2004 | Mather | |
| 6,840,462 B2 | 1/2005 | Hurray et al. | |
| 6,978,916 B2 | 12/2005 | Smith | |
| 7,014,131 B2 | 3/2006 | Berning et al. | |
| 7,021,571 B1 | 4/2006 | Lawson et al. | |
| 7,143,959 B2 | 12/2006 | Smith et al. | |
| 7,188,789 B2 | 3/2007 | Schwegler et al. | |
| RE39,767 E * | 8/2007 | Soule et al. | 239/468 |
| 2002/0130202 A1 | 9/2002 | Kah, Jr. et al. | |
| 2003/0121992 A1 | 7/2003 | Woods | |
| 2004/0089743 A1 | 5/2004 | Tilton et al. | |
| 2004/0195359 A1 | 10/2004 | Curtis | |
| 2005/0087633 A1 | 4/2005 | Gopalan | |
| 2005/0161534 A1 | 7/2005 | Kah, Jr. et al. | |
| 2005/0263620 A1 | 12/2005 | Prieto et al. | |
| 2006/0038046 A1 | 2/2006 | Curtis | |
| 2006/0065765 A1 | 3/2006 | Hester et al. | |
| 2006/0091242 A1 | 5/2006 | Gopalan et al. | |
| 2006/0289679 A1 | 12/2006 | Johnson et al. | |
| 2007/0069049 A1 | 3/2007 | Lipthal et al. | |
| 2007/0290007 A1 | 12/2007 | Eberhardt | |

FOREIGN PATENT DOCUMENTS

| | | |
|---|---|---|
| JP | S57-106460 U | 6/1982 |
| JP | S60-125270 A | 7/1985 |
| JP | 2002-173184 A | 6/2002 |

OTHER PUBLICATIONS

PCT/US2008/011132 International Search Report and Written Opinion dated Jul. 23, 2009.

* cited by examiner

FLUID DISPENSING NOZZLE

CROSS-REFERENCE TO RELATED APPLICATIONS

The present application claims the benefit of U.S. Provisional Application No. 60/974,941, filed Sep. 25, 2007.

FIELD OF THE DISCLOSURE

The present disclosure generally relates to fluid dispensing devices and, more particularly, to nozzle assemblies for producing desired spray coverage patterns.

BACKGROUND OF THE DISCLOSURE

Spray nozzles are used to dispense fluids from a variety of different containers. The containers may hold one or a combination of various ingredients, and typically use a permanent or temporary pressure force to discharge the contents of the container. When the container is an aerosol can, for example, one or more chemicals or other active ingredients to be dispensed are usually mixed in a solvent and are typically further mixed with a propellant to pressurize the can. Known propellants include carbon dioxide, selected hydrocarbon gas, or mixtures of hydrocarbon gases such as a propane/butane mix. For convenience, materials to be dispensed may be referred to herein merely as "actives", regardless of their chemical nature or intended function.

The active/propellant mixture may be stored under constant, but not necessarily continuous, pressure in an aerosol can. A release valve is mounted in the top end of the can and is normally in a closed position. An activator button is coupled to the release valve such that it will move the release valve to the open position when the activator is pushed in a predetermined direction, such as down or sideways. The sprayed active may exit in an emulsion state, single phase, multiple phase, and/or partial gas phase. Without limitation, actives can include insect control agents (such as propellant, insecticide, or growth regulator), fragrances, sanitizers, cleaners, waxes or other surface treatments, and/or deodorizers.

In simple arrangements, pressure on a valve control stem can be provided by finger pressure on a button attached to the stem and having an internal passageway that leads the contents of the can to an outlet on the side of the button. In response to actuation of the valve, the can contents are permitted to pass through the outlet via the internal passageway, thereby generating a spray that exits into the ambient environment.

In non-aerosol applications, a temporary pressure force is used to discharge the contents of the container. Trigger pumps, for example, use manual force to advance fluid through a dip tube in the container for ultimate discharge through the spray nozzle.

The spray patterns generated by conventional nozzles are not particularly well suited for many household applications. Conventional nozzles typically generate a conical spray jet, which leads to inconsistent, uneven coverage of a surface. Additionally, when treating planar surfaces having square or rectangular shapes (such as shower walls), it is often very difficult to evenly reach the total surface of the wall with a conical-shaped spray jet. Indeed, a conical-shaped spray jet cannot reach corners without also partially reaching adjacent surfaces, leading to overspraying. Other nozzles are known which produce a relatively flat fan-shaped spray jet. While a fan-shaped jet can reach corners more reliably without overspraying, the product to be dispensed is not distributed uniformly across the entire spray pattern and the relatively flat pattern requires excessive movement by the user to reach the entire surface to be covered.

SUMMARY OF THE DISCLOSURE

According to certain embodiments, a nozzle for dispensing a liquid from a container is provided that includes an actuator having an inlet end adapted to receive liquid from the container and an outlet end, the actuator outlet end defining an outlet chamber. An insert is coupled to the actuator outlet end and defines an insert passage in fluid communication with the outlet chamber, the insert including a first convex shoulder disposed downstream of the outlet chamber, and a nozzle outlet disposed downstream of the first convex shoulder.

According to other embodiments, a nozzle for dispensing a liquid from a container may include an actuator having an inlet end adapted to receive liquid from the container and an outlet end, the actuator outlet end including a cylindrical inner wall and a center post extending at least partially through the inner wall to define an annular outlet chamber. An insert has an inlet end coupled to the actuator outlet end and defines an insert passage in fluid communication with the outlet chamber. The insert further defines a transition chamber disposed downstream of the inlet passage and includes opposed first and second convex shoulders, opposed first and second planar walls extending between the first and second convex shoulders, and a nozzle outlet disposed downstream of the first and second convex shoulders.

According to still further embodiments, a nozzle insert is provided for use with a container of liquid having an actuator, the actuator having an inlet end adapted to receive liquid from the container and an outlet end, the actuator outlet end defining an outlet chamber. The nozzle insert may include an inlet end coupled to the actuator outlet end and defining an insert passage in fluid communication with the outlet chamber. A transition chamber is disposed downstream of and fluidly communicating with the inlet passage, and diametrically opposed first and second convex shoulders are disposed in the transition chamber. Diametrically opposed first and second planar walls extend between the first and second convex shoulders, each of the first and second planar walls being disposed at an angle of convergence. A nozzle outlet is disposed downstream of the first and second convex shoulders.

BRIEF DESCRIPTION OF THE DRAWINGS

For a more complete understanding of this disclosure, reference should be made to the embodiments illustrated in greater detail on the accompanying drawings, wherein.

Figure 1:
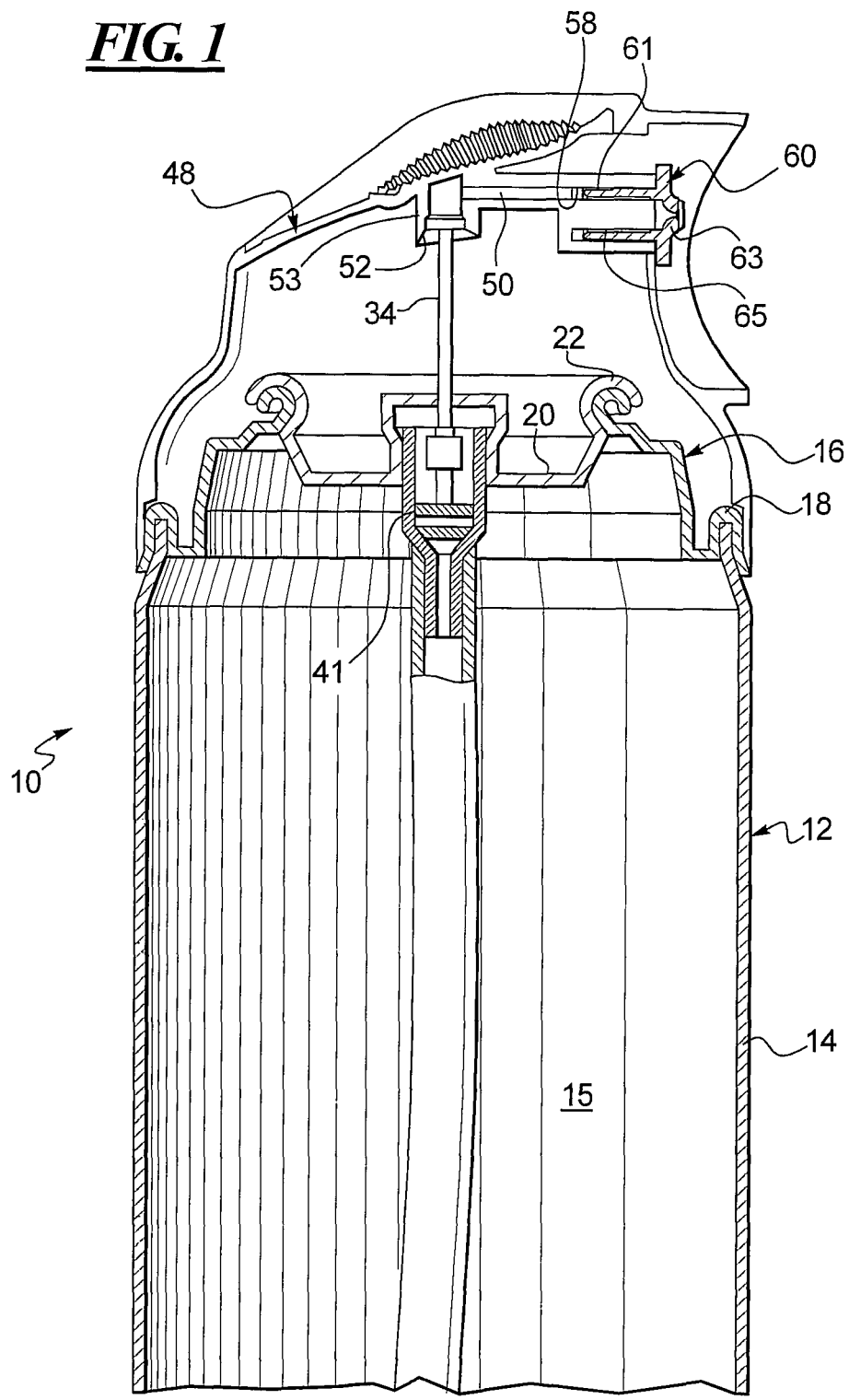
FIG. 1 is a side elevation view, partially in section, of an aerosol can having a nozzle insert and actuator constructed in accordance with the present disclosure.
Figure 2:
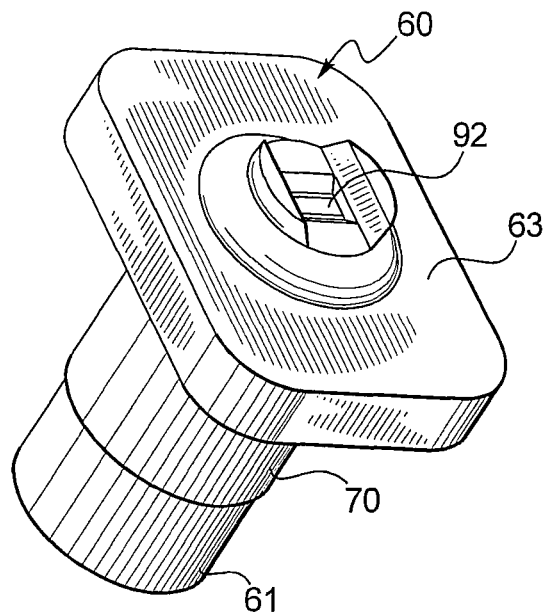
FIG. 2 is an enlarged perspective view of a nozzle insert.
Figure 3:
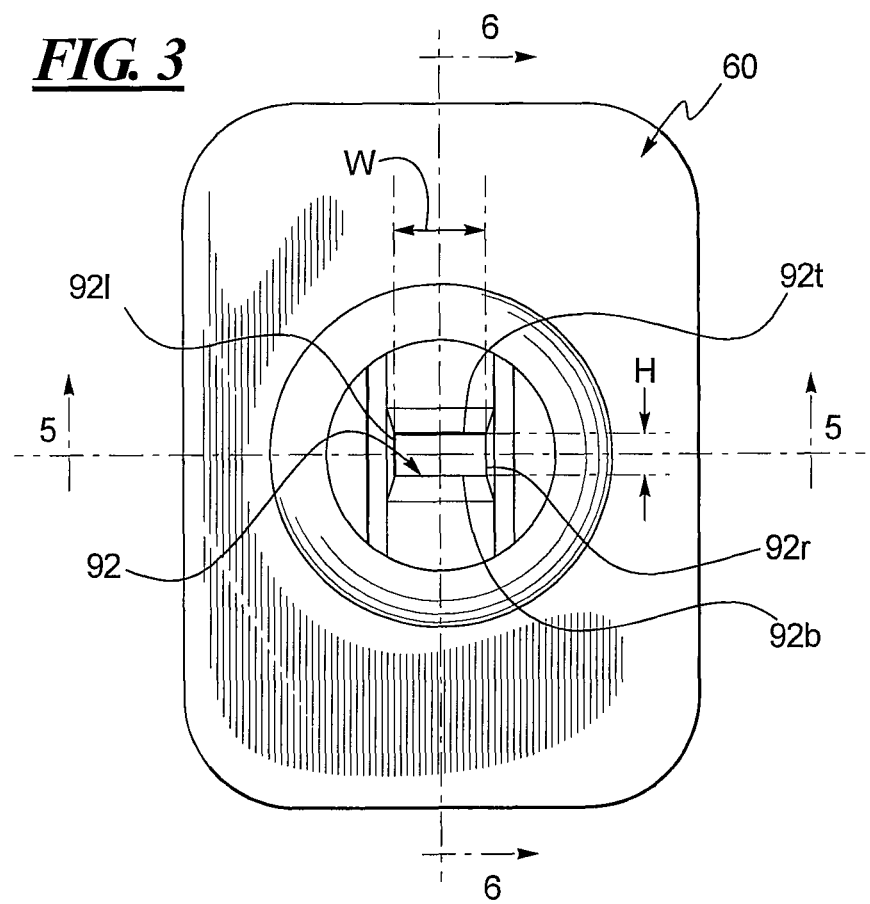
FIG. 3 is a front elevation view of the insert.
Figure 4:
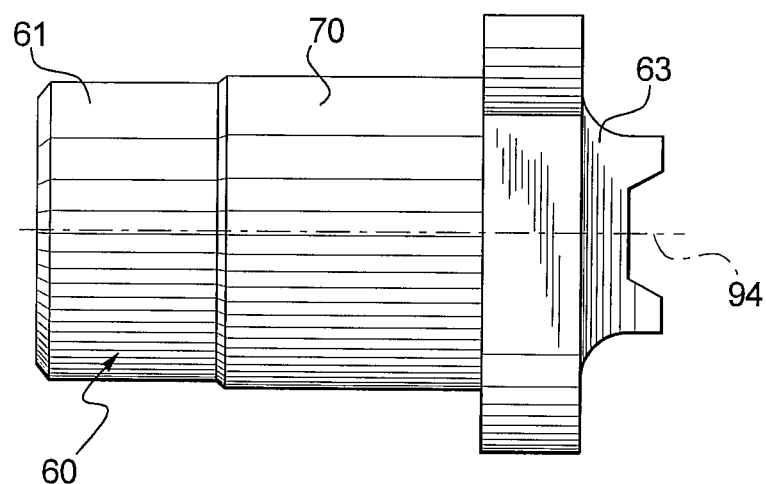
FIG. 4 is a side elevation view of the insert.
Figure 5:
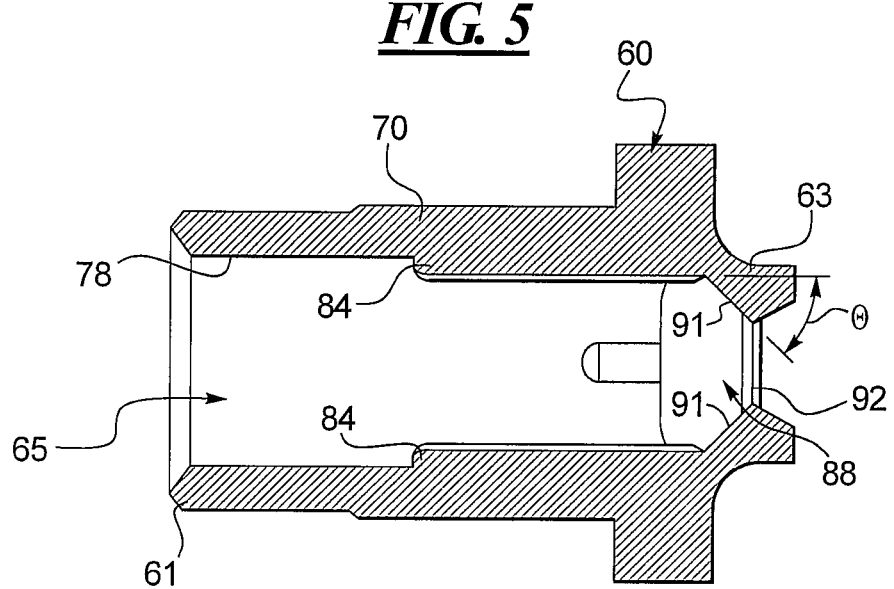
FIG. 5 is a cross-sectional view of the insert taken along line 5-5 of FIG. 3.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Dispensing nozzles are disclosed herein which are capable of generating an enlarged, generally rectangular or oval spray pattern. An exemplary nozzle includes an actuator cap defining an outlet channel and a support post. A nozzle insert is coupled to the actuator cap and fluidly communicates with the outlet channel. The insert may include flow directing structures that guide the fluid flow toward unobstructed portions of the exit orifice. The insert further includes a transition chamber having a pair of opposed, convex shoulders which are aligned with the unobstructed portions of the exit orifice. Additionally, the transition chamber includes a pair of opposed, planar walls that converge along selected angles leading to a nozzle outlet. As material travels through the exit orifice, the flow directing structures guide the flow toward the shoulders to cause the material to exit the nozzle in a jet having portions that discharge at a relatively wide angle, thereby obtaining a generally oval or rectangular spray pattern. The converging, planar walls provide a relatively narrow discharge angle, as desired.

As used herein, the term "spray jet" refers to the three-dimensional shape of the material between the exit orifice and the target surface, while the term "spray pattern" refers to the two-dimensional area of the target surface that is covered by material when the nozzle is held stationary.

An exemplary embodiment of a spray nozzle is illustrated at FIG. 1 in the environment of an aerosol container. It will be appreciated, however, that other types of containers and discharging means, such as trigger pumps, may be used without departing from the scope of this disclosure.

The illustrated aerosol dispenser 10 includes a container 12, such as a conventional aerosol metal (e.g., aluminum or steel) can, that defines an internal chamber 15 capable of housing material to be dispensed under pressure. The container 12 includes a cylindrical wall 14 that is closed at its upper margin by a dome 16. The upper margin of the can wall 14 is joined to the dome via a can chime 18. An upwardly open valve cup 20 is located at the center of the dome 16 and is crimped or otherwise joined to the dome to form a valve cup rim 22 in a conventional manner.

The aerosol dispenser 10 includes a conventional aerosol valve 41 (see, e.g., U.S. Pat. No. 5,068,099 for another such valve) crimped to the valve cup 20 and the valve cup rim 22 in a conventional manner. The aerosol valve 41 has a valve stem 34 that is hollow and extends axially upward from the valve cup 20.

A variety of other conventional aerosol valves are well known to the art. These valves are activated by moving their valve stems downwardly and/or sidewardly. Upon such activation, pressurized material is dispensed that is contained within the container is delivered from the valve stem. Still other known valves may be used in non-aerosol applications.

An actuator 48 is mounted in cooperative relation to the valve stem 34. The actuator 48 may be mounted exclusively on the valve stem 34, in the manner of a common aerosol button, or it may be part of an overcap or other structure mounted on the chime 18 or valve cup rim 22. Such alternative modes of mounting actuators to aerosol cans are well known in the art and the present disclosure is not limited to any particular mounting strategy.

The actuator 48 has an actuator through passage 50 that extends from an actuator inlet end 52 to an actuator outlet end 58. The actuator inlet end 52 has a socket 53 capable of receiving the valve stem 34 in liquid-tight relation. According to the present disclosure, a nozzle insert 60 is mounted in the actuator outlet end 58. The nozzle insert 60 is in the form of an elongated, generally tubular body having an inlet end 61, an outlet end 63, and a conduit 65 communicating therebetween, as best shown in FIGS. 5 and 6. The nozzle insert 60 can be made by conventional injection molding techniques and is preferably made of a resilient plastic such as polypropylene or polyethylene. When the aerosol valve 41 is activated, material to be dispensed is released to travel through the actuator via the actuator through passage 50 for ultimate discharge to atmosphere through the nozzle insert 60.

As best shown in FIGS. 2-6, the nozzle insert inlet end 61 includes an outer wall surface 70 sized to frictionally engage an inner wall surface 72 of the actuator outlet end 58. The inner wall surface 72 is cylindrical and surrounds a center post 74, to define an annular outlet chamber 76 therebetween (FIG. 6). The insert 60 further includes an interior wall 78 defining an insert passage 80. When the insert 60 is coupled to the actuator 48, the center post 74 blocks off a central portion of the insert passage to define an annular flow path between the center post 74 and the insert interior wall 78. A pair of projections 82 may be provided to help center the insert 60 on the center post 74. As best shown in FIGS. 5 and 6, projections 82 may be formed as fingers that project radially inwardly from the insert interior wall 78. The projections 82 may be sized and positioned so that they slidingly engage diametrically opposed portions of the center post 74. It will be appreciated, however, that the projections 82 may be provided in configurations other than fingers and may engage the center post 74 in other manners.

The insert 60 may further include obstructions for directing fluid flow toward desired portions of the annular flow path extending through the insert 60. As best shown in FIGS. 5 and 6, the obstructions may be formed as tabs 84 which extend inwardly from the insert interior wall 78. The tabs 84 are sized and shaped to sealingly engage with the center post 74, thereby to prevent fluid flow therebetween. As a result, the tabs 84 divert portions of the fluid toward unobstructed portions of the flow path, as illustrated by the arrows 86 in FIG. 6. The obstructions may be provided in forms other than the illustrated tabs 84, as long as they direct fluid flow to the desired areas of the insert passage 80.

The nozzle insert 60 may be further configured to dispense material at an increased discharge angle, thereby to generate a spray jet having a non-conical shape. The insert 60 further includes a transition chamber 88 which receives fluid exiting from the annular flow path. The transition chamber 88 includes a first pair of jet-shaping surfaces in the form of diametrically opposed shoulders 90, which direct portions of the fluid flow toward a nozzle outlet 92. Each shoulder 90 may be configured to have a substantially constant radius, convex shape as shown in FIG. 6. For example, the radius of the shoulders may be approximately 0.03 to 0.15 inches (0.08 to 0.38 centimeters), and preferably approximately 0.05 inches (0.13 cm) as discussed in greater detail below.

The illustrated embodiment uses two curved walls and two planar walls to obtain a non-conical spray jet shape. As best illustrated with reference to FIGS. 3, 5, and 6, the shoulders 90 are formed in the transition chamber walls leading to the "top" and "bottom" edges **92*t*, 92*b* of the nozzle outlet 92. The transition chamber further includes two side walls 91 that are substantially planar and converge toward one another leading to the "left" and "right" edges 92*l*, 92*r* of the nozzle outlet 92. Fluid traveling over the shoulders 90 is directed through the nozzle outlet 92** at an increased discharge angle "a" with respect to a horizontal reference line 94 than would otherwise be obtained with planar walls leading to the outlet, such as the planar converging walls 91. Accordingly, the combination of curved shoulders 90 and planar walls 91 generates a spray jet having top and bottom edges that discharge at a larger exit angle than the left and right side edges to produce a rectangular or oval spray pattern. While the foregoing description uses the terms "top," "bottom," "left," and "right" to identify certain directions or portions of the insert, this is done only with respect to the illustrated embodiment as presented in the drawings, and therefore this disclosure and the appended claims are not intended to be limited by the particular directions disclosed herein.

Figure 6:
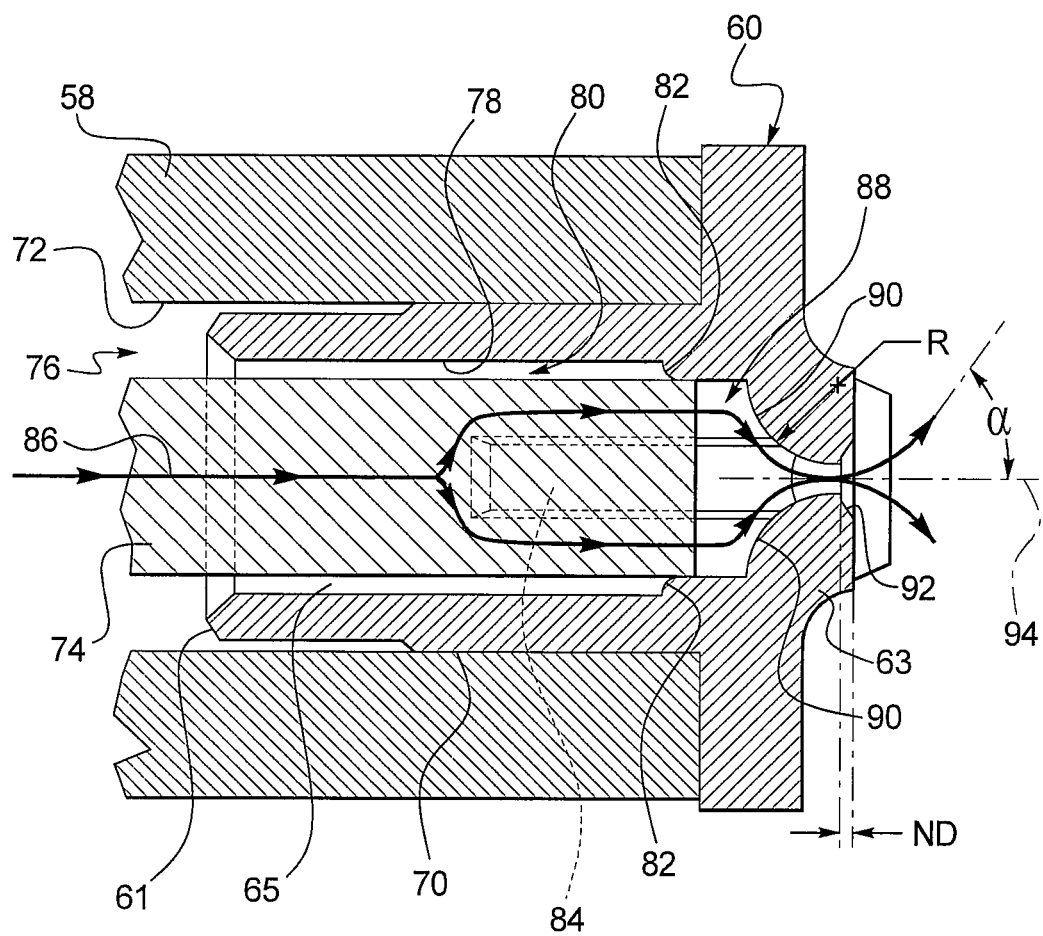
FIG. 6 is a cross-sectional view of the insert and a portion of the actuator cap taken along line 6-6 of FIG. 3.

Applicants have found that the discharge angle α is primarily influenced by the radius of curvature of the curved surfaces of the shoulders 90 over which the fluid flows. More specifically, applicants have found that the discharge angle is inversely proportional to the radius of curvature R (FIG. 6) of each shoulder 90. The curved shoulders impart an angular force to the fluid that influences the discharge angle. The angular force may be expressed as a pressure gradient $\partial p/\partial r$, in which:

$$\partial p/\partial r = \rho V_\theta^2 / R,$$

where, $\rho$ is the density of the fluid, $V_\theta$ is the tangential component of fluid velocity, and R is the radius of curvature of the surface over which the fluid flows.

Accordingly, as the radius of curvature increases, the magnitude of the angular force (and therefore the discharge angle α) will decrease. An acceptable range of sizes for the radius of curvature R can be developed based on this relationship and parameters associated with the aerosol can. More specifically, if the radius of curvature is too large, the discharge angle will be undesirably small and therefore will not produce the desired spray pattern. Additionally, if the radius of curvature is too small, more pressure is required in the can to achieve the same product discharge rate. Another practical consideration regarding the lower end of the range is that it is more difficult and expensive to manufacture smaller geometries. Based upon testing, applicants have determined that the radius of curvature is preferably approximately 0.03 to 0.15 inches (0.08 to 0.38 centimeters) to produce desirable spray pattern results while maintaining a discharge rate of approximately 0.5-8.0 grams/second under a typical aerosol can pressure. As used herein, a typical aerosol can pressure is an initial can pressure, at a standard room temperature of approximately 70° F., of approximately 1-100 psi, and is preferably approximately 30-80 psi and more preferably approximately 40-50 psi.

Another primary factor influencing the discharge angle $\alpha$ is the angle of convergence $\theta$ of the planar walls 91. The planar walls 91 influence the discharge angle $\alpha$ even though they are disposed generally normal to the shoulders 90. As best shown in FIG. 5, the planar walls 91 converge at an angle with respect to a horizontal reference line, described herein as the angle of convergence $\theta$. Variances in the angle of convergence $\theta$ influence the discharge angle $\alpha$ and the uniformity of coverage across the spray pattern. Through testing, it has been determined that if the angle of convergence is too large, unacceptable pressure losses will result. If the angle of convergence is too small, then the angle of discharge is too small (i.e., the product will not fan out sufficiently to produce the desired spray pattern). Based on these observations, applicants developed an acceptable range for the angle of convergence $\theta$, which is approximately 30-60°, with an angle of approximately 45° being preferred. This range of angles sufficiently maintained the desired spray pattern at a product discharge rate of approximately 0.5 to 8.0 grams/second under a typical aerosol can pressure.

The desired spray pattern is obtained when the radius of curvature R and the angle of convergence $\theta$ are within the above-noted ranges. More specifically, this combination of features will produce an angle of discharge a of approximately 30-37°, with suitable consistency of coverage across the entire spray pattern. Again, testing was performed under standard aerosol pressures using a product discharge rate of approximately 6.0 grams/second, however the product flow rate may be anywhere within the range of approximately 0.5-8.0 grams/second while still providing the benefits taught herein.

A secondary factor influencing the discharge angle $\alpha$ is the distance between the curved surfaces of the shoulders 90 and the nozzle outlet 92. The angular forces created by the curved surfaces will dissipate as the fluid travels over a planar surface, and therefore the force is also inversely proportional to the distance between the curved surface and the nozzle outlet, identified herein as the "nozzle distance" and illustrated in FIG. 6 with reference symbol "ND." Accordingly, as the nozzle distance decreases, the magnitude of the angular force (and therefore the discharge angle) will increase.

The nozzle outlet 92 is preferably configured with an elongate, rectangular shape as best shown in FIG. 3. In the illustrated orientation, the nozzle outlet 92 has a width "W" that is greater than a height "H". With this arrangement, the insert 60 produces a spray pattern that is generally rectangular and has a vertical dimension which is greater than a horizontal dimension.

In operation, the actuator 48 is activated to open the aerosol valve 41, thereby releasing fluid material from the pressurized container 12. Fluid travels through the actuator through passage 50 and into the actuator outlet end. The insert 60 directs the fluid from the actuator outlet end into the annular flow path defined between the insert interior wall 78 and the center post 74. Some of the fluid flowing through the annular flow path is diverted by the tabs 84 toward unobstructed portions of the flow path. The fluid continues down the annular flow path until it discharges into the transition chamber 88. The fluid then passes over the shoulders 90 and planar walls 91, which causes the fluid to discharge through the nozzle outlet 92 at a wider vertical discharge angle $\alpha$.

While the illustrated embodiment discusses the use of both tabs and shoulders, an increased discharge angle may be obtained by the use of shoulders only.

While such embodiments have been set forth, alternatives and modifications will be apparent in the above description to those skilled in the art. These and other alternatives are considered equivalents in the spirit and scope of this disclosure and the appended claims.

INDUSTRIAL APPLICABILITY

The present disclosure provides nozzles inserts and actuators used when converting aerosol spray streams into spray patterns having relatively wide discharge angles, and methods for using them.

What is claimed is:

1. A nozzle for dispensing a liquid from a container, comprising:

an actuator having an inlet end adapted to receive liquid from the container and an outlet end, the actuator outlet end defining an outlet chamber having an inner wall surface; and a unitary insert received within the outlet chamber and coupled at a first location on an outer wall surface of the insert to the inner wall surface of the outlet chamber and defining an insert passage in fluid communication with the outlet chamber, the insert including a first convex shoulder disposed downstream of the outlet chamber, and a nozzle outlet disposed downstream of the first convex shoulder, the insert further comprising a first obstruction extending inwardly into the insert passage from an interior wall surface of the insert, the first obstruction sized to sealingly engage the actuator end within the outlet chamber at a second location, thereby to direct fluid toward at least a first unobstructed portion of the insert passage, and in which a convex surface of the first convex shoulder is substantially aligned with the insert passage first unobstructed portion, thereby to direct fluid from the first unobstructed portion over the convex surface before exiting the nozzle outlet.

2. The nozzle of claim 1, in which the outlet chamber has an annular cross-sectional shape.

3. The nozzle of claim 1, in which the first convex shoulder has a continuous radius.

4. The nozzle of claim 3, in which the radius is approximately 0.03 to 0.150 inches.

5. The nozzle of claim 1, in which the container comprises an aerosol container having an aerosol valve, and in which the actuator inlet end is configured to actuate the aerosol valve.

6. The nozzle of claim 1, in which the insert further defines a transition chamber disposed downstream of and fluidly communicating with the insert passage, and in which the first convex shoulder is disposed in the transition chamber.

7. A nozzle for dispensing a liquid from a container, comprising:
an actuator having an inlet end adapted to receive liquid from the container and an outlet end, the actuator outlet end defining an outlet chamber; and
an insert coupled at a first location on an outer wall surface of the insert to the actuator outlet end and defining an insert passage in fluid communication with the outlet chamber, the insert including a first convex shoulder disposed downstream of the outlet chamber, and a nozzle outlet disposed downstream of the first convex shoulder, the insert further comprising a first obstruction sized to sealingly engage the actuator end at a second location, thereby to direct fluid toward at least a first unobstructed portion of the insert passage, and in which a convex surface of the first convex shoulder is substantially aligned with the insert passage first unobstructed portion, thereby to direct fluid from the first unobstructed portion over the convex surface before exiting the nozzle outlet, in which the outlet chamber has an annular cross-sectional shape, and in which the actuator outlet end includes a cylindrical inner wall and a cylindrical center post extending at least partially through the inner wall, and in which the outlet chamber is defined between the inner wall and the center post.

8. The nozzle of claim 7, in which the insert includes an inlet end sized for insertion into the actuator outlet chamber.

9. The nozzle of claim 8, in which the insert inlet end is sized to frictionally engage the actuator inner wall, the insert inlet end further including a cylindrical interior wall defining the insert passage.

10. A nozzle for dispensing a liquid from a container, comprising:
an actuator having an inlet end adapted to receive liquid from the container and an outlet end, the actuator outlet end defining an outlet chamber; and
an insert coupled at a first location on an outer wall surface of the insert to the actuator outlet end and defining an insert passage in fluid communication with the outlet chamber, the insert including a first convex shoulder disposed downstream of the outlet chamber, and a nozzle outlet disposed downstream of the first convex shoulder, the insert further comprising a first obstruction sized to sealingly engage the actuator end at a second location, thereby to direct fluid toward at least a first unobstructed portion of the insert passage, and in which a convex surface of the first convex shoulder is substantially aligned with the insert passage first unobstructed portion, thereby to direct fluid from the first unobstructed portion over the convex surface before exiting the nozzle outlet, and further comprising a second convex shoulder disposed downstream of the outlet chamber and positioned diametrically opposite the first convex shoulder.

11. The nozzle of claim 10, in which the insert further comprises a second obstruction configured to direct fluid toward a second unobstructed portion of the insert passage, and in which a second convex shoulder is substantially aligned with the second unobstructed portion of the insert passage.

12. A nozzle for dispensing a liquid from a container, comprising:
an actuator having an inlet end adapted to receive liquid from the container and an outlet end, the actuator outlet end being a cylindrical inner wall and a center post extending at least partially through the inner wall to define an annular outlet chamber; and
an insert having an inlet end coupled to the actuator outlet end and defining an insert passage in fluid communication with the outlet chamber, a transition chamber disposed downstream of the inlet passage and including opposed first and second convex shoulders, opposed first and second planar walls extending between the first and second convex shoulders, and a nozzle outlet disposed downstream of the first and second convex shoulders, the insert further comprising diametrically opposed first and second obstructions sized to sealingly engage the center post of the actuator outlet end, thereby to direct fluid toward first and second unobstructed portions of the insert passage, and in which first and second convex surfaces of the first and second convex shoulders are substantially aligned with the insert passage first and second unobstructed portions, respectively, thereby to direct fluid from the first and second unobstructed portions over the first and second convex surfaces before exiting the nozzle outlet.

13. The nozzle of claim 12, in which each of the first and second convex shoulders has a continuous radius.

14. The nozzle of claim 13, in which the radius of each of the first and second convex shoulders is approximately 0.03 to 0.150 inches.

15. The nozzle of claim 12, in which each of the first and second planar walls of the transition chamber are disposed at an angle of convergence of approximately 30 to 60°.

16. A nozzle insert for use with a container of liquid having an actuator, the actuator having an inlet end adapted to receive liquid from the container and an outlet end, the actuator outlet end defining an annular outlet chamber, the nozzle insert comprising:
an inlet end disposed in the annular outlet chamber and coupled to the actuator outlet end and defining an insert passage in fluid communication with the annular outlet chamber;

a transition chamber disposed downstream of and fluidly communicating with the insert passage and through which liquid passes before exiting a nozzle outlet;

diametrically opposed first and second convex shoulders over which the liquid passes disposed in the transition chamber and adjacent the insert passage;

diametrically opposed first and second planar walls extending between the first and second convex shoulders, each of the first and second planar walls being disposed at an angle of convergence downstream of the planar walls; and the nozzle outlet disposed downstream of the first and second convex shoulders, the nozzle outlet including top, bottom, left and right edges downstream of the convex shoulders and provided at acute angles relative to a longitudinal axis extending through the nozzle insert.

17. The nozzle of claim 16, further comprising diametrically opposed first and second obstructions configured to direct fluid toward first and second unobstructed portions of the insert passage, and in which the first and second convex shoulders are substantially aligned with the insert passage first and second unobstructed portions, respectively.

18. The nozzle of claim 16, in which each of the first and second convex shoulders has a continuous radius of approximately 0.03 to 0.15 inches, and in which the angle of convergence of each of the first and second planar walls is approximately 30 to 60°.

19. A nozzle for dispensing a liquid from a container, comprising:

an actuator having an inlet end adapted to receive liquid from the container and an outlet end, the actuator outlet end defining an outlet chamber;

a unitary insert received within the outlet chamber and coupled to the actuator outlet end and defining an insert passage in fluid communication with the outlet chamber, the insert including a first convex shoulder disposed downstream of the outlet chamber, and a nozzle outlet disposed downstream of the first convex shoulder, the insert further comprising a first obstruction extending inwardly into the insert passage from an interior wall surface of the insert, the first obstruction sized to sealingly engage the actuator outlet end within the outlet chamber, thereby to direct fluid toward at least a first unobstructed portion of the insert passage, and in which a convex surface of the first convex shoulder is substantially aligned with the insert passage first unobstructed portion, thereby to direct fluid from the first unobstructed portion over the convex surface before exiting the nozzle outlet; and wherein the nozzle outlet includes top, bottom, left and right edges provided at an acute angle relative to a longitudinal axis extending through the nozzle.

20. A nozzle for dispensing a liquid from a container, comprising:

an actuator having an inlet end adapted to receive liquid from the container and an outlet end, the actuator outlet end including a cylindrical inner wall and a center post extending at least partially through the inner wall to define an annular outlet chamber;

an insert having an inlet end coupled to the actuator outlet end and defining an insert passage in fluid communication with the outlet chamber, a transition chamber disposed downstream of the inlet passage and including opposed first and second convex shoulders, opposed first and second planar walls extending between the first and second convex shoulders, and a nozzle outlet disposed downstream of the first and second convex shoulders, the insert further comprising diametrically opposed first and second obstructions sized to sealingly engage the center post, thereby to direct fluid toward first and second unobstructed portions of the insert passage, and in which first and second convex surfaces of the first and second convex shoulders are substantially aligned with the insert passage first and second unobstructed portions, respectively, thereby to direct fluid from the first and second unobstructed portions over the first and second convex surfaces before exiting the nozzle outlet; and wherein the nozzle outlet includes top, bottom, left and right edges provided at an acute angle relative to a longitudinal axis extending through the nozzle.

* * * * *